UNITED STATES PATENT OFFICE.

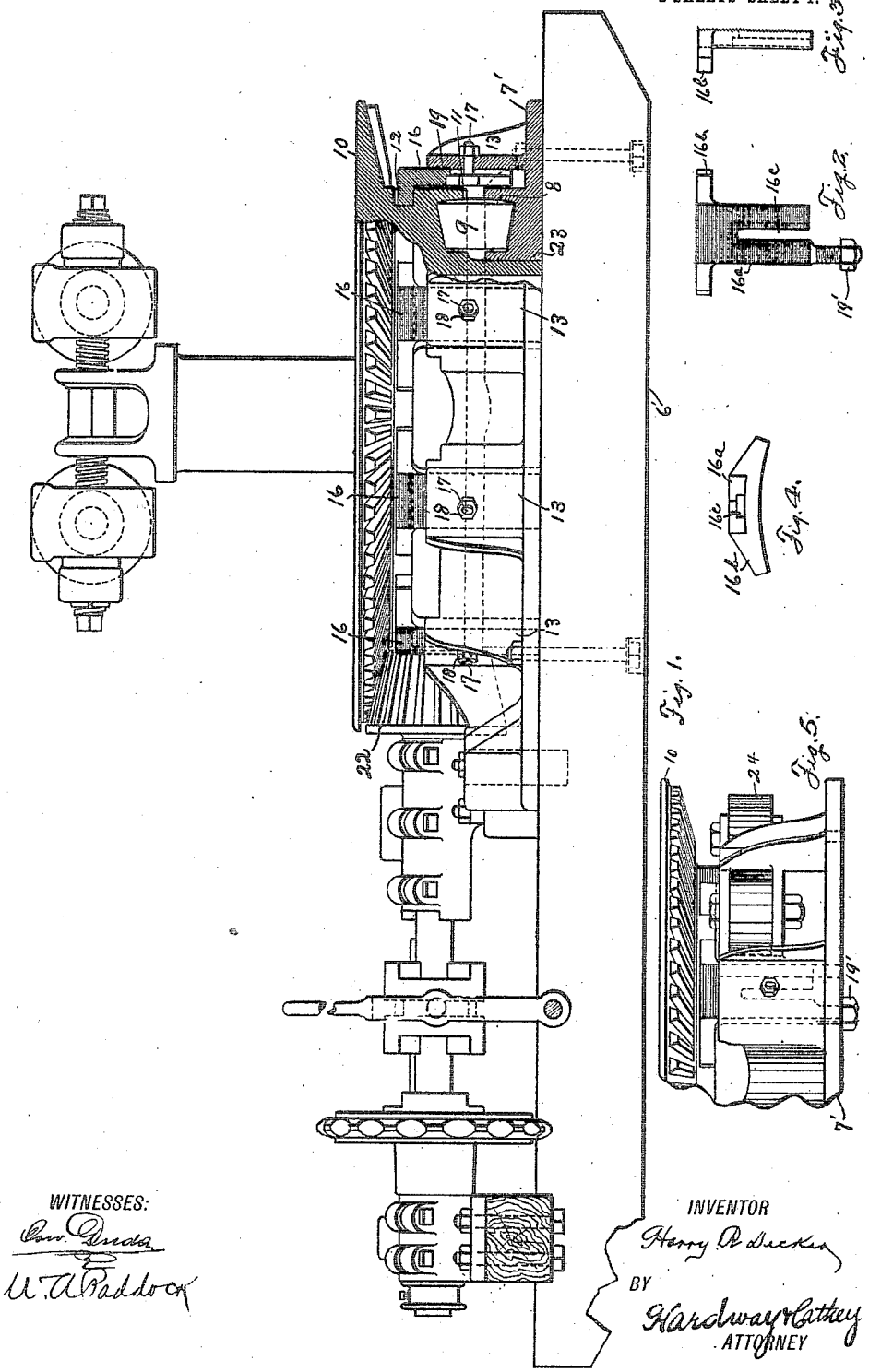

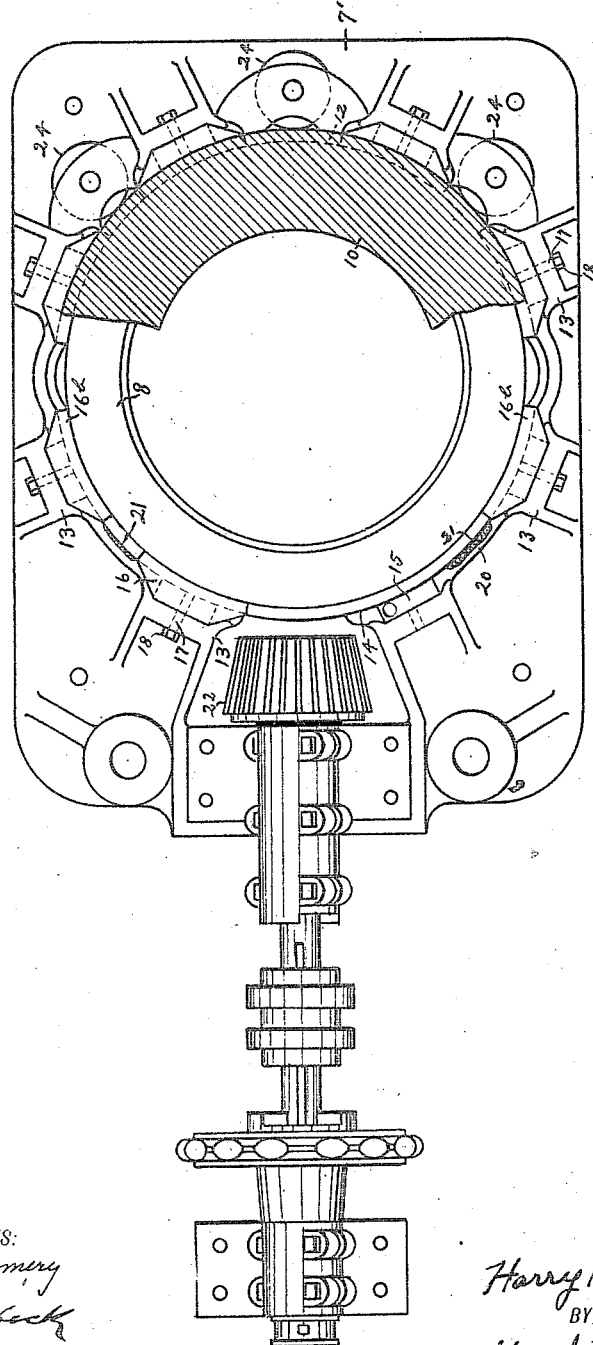

HARRY R. DECKER, OF HOUSTON, TEXAS.

ROTARY.

1,044,630.  Specification of Letters Patent.  Patented Nov. 19, 1912.

Application filed January 21, 1911. Serial No. 603,859.

*To all whom it may concern:*

Be it known that I, HARRY R. DECKER, a citizen of the United States, residing at Houston, in the county of Harris and State of Texas, have invented certain new and useful Improvements in Rotaries, of which the following is a specification.

My invention relates to new and useful improvements in rotaries and has particular relation to such devices wherein the rotary table is adjustably secured upon the base plate.

The object of the invention is to provide a device of the character described wherein the rotary table is so secured upon its base plate as to be readily adjusted relative thereto and further comprehends the provision of a novel construction arranged to resist the thrusts of the driving mechanism, as well as to prevent the lateral movement of the table due to the swaying of the driving pipe.

With the above and other objects in view my invention has particular relation to certain novel features of construction, operation and arrangement of parts, an example of which is given in this specification and illustrated in the accompanying drawings; wherein:—

Figure 1 is a side elevation of the device, partially in section. Fig. 2 is a front elevation of a table anchor. Fig. 3 is a side elevation of a modified form thereof. Fig. 4 is a bottom end view thereof. Fig. 5 is a fragmentary side elevation of the rotary, showing the means for resisting the thrust of the drive mechanism. Fig. 6 is a plan view of the device showing a partial horizontal section of the table and also showing a plan view of the base plate in one of the anchors removed.

Referring now more particularly to the drawings, wherein like numerals of reference designate similar parts in each of the figures, the numeral 6' refers to the bed frame of the machine which has the base plate 7', secured thereon, formed with a race way ring 8, in which the antifriction bearings 9 are located.

The numeral 10 indicates a rotary table having a raceway ring 11 to receive and seat on bearings 9 and formed with an annular groove 12 therearound for a purpose presently to be described.

The base plate 7' is provided with a plurality of upstanding anchor supports which are integral therewith and surround the rotary table. The inner surfaces of these supports are faced and contact with the periphery of said table, as at 14. These supports are provided, on their inner sides with vertical grooves 15 for the reception of anchors 16. This anchor comprises a plate $16^a$ provided with the shoulder $16^b$, at its upper end, which projects into groove 12 and is designed to hold the table anchored on the base plate.

The anchor is provided with a lengthwise slot $16^c$ which receives bolt 17, which projects also through brace 13 and is secured in place by means of nut 18. When this nut is loosened the anchor may be raised or lowered on the bolt and when the nut is tightened the rear corrugated surface of said anchor is drawn tightly against the corrugated inner surface of brace 13 and the anchor, and rotary table, are firmly held against vertical movement, relative to the base plate. As shown in Figs. 2 and 5 the anchor may be extended down through the base plate and the lower end thereof threaded to receive nut 19' and thus be held firmly against upward movement.

The braces 13 may be connected by bridges 20 whose inner faces have wide vertically extending grooves for the reception of babbitt 21, which may be readily replaced, as worn away and the lateral play of the rotary table thus taken up.

The rotary table is driven by a bevel gear wheel 22 which meshes with a bevel gear face on the under side of said table and a lateral and upward thrust is imparted to said table from the gear wheel as force is transmitted from the latter to the former. In the ordinary form of rotary the full force of this thrust is received by shoulder 23 of the base plate, located below the point of thrust. In this form of rotary the force of this thrust is resisted by the braces 13 which directly oppose the point of thrust, as well as by anchors 16, and the table is held more firmly in position, therein embodying an improvement over the form of rotaries now in common use.

Directly opposite bevel gear 22 are mounted, upon the base plate, the rotatable bearings 24, which contact with the periphery of the rotary table and diminish the friction of said table against the braces 13 as well as receive the thrust imparted to the table from gear 22.

The rotation of table 10 gradually wears away the bearings 9 and by reason of said wear the table acquires too much vertical play. In such event the nuts 18 may be loosened and the table and anchors 16 lowered and these nuts and nuts 19' again tightened and the wear and play of said table thus taken up.

A rotary constructed as shown and described will have a table firmly anchored on its base plate and not so susceptible to wear and lost motion as those in common use and will possess the further advantage of being so constructed that the vertical play of the table on the base plate may be readily taken up.

What I claim is:—

1. A device of the character described including a suitable base and a rotary table mounted thereon, means integral with the base and surrounding the rotary table for securing the table against lateral movement on the base and means for adjusting the table relative to the base.

2. A device of the character described including a base plate and a rotary table mounted thereon and vertically adjustable relative thereto and an upstanding brace carried by the base plate and integral therewith and bracing against said table for restricting its lateral movement.

3. A device of the character described including a suitable base and a rotary table mounted thereon, a plurality of braces carried by said base and integral therewith and surrounding said table for restricting its lateral movement and a plurality of anchors adjustably secured to said braces and engaging with the table for fixing the position of said table relative to the base.

4. A device of the character described including a base plate, a rotary table mounted thereon, a means for driving said table, upstanding braces integral with the base plate and surrounding the table and bearing members carried by the braces opposing the driving means and bearing against the periphery of the table.

5. A device of the character described including a base plate, a rotary table mounted thereon, a means for driving said table, upstanding braces carried by the base plate and surrounding the table and rotatable bearing members carried by the braces opposing the driving means and bearing against the periphery of the table.

6. A device of the character described including a base plate, a rotary table mounted thereon, a means for driving said table, upstanding braces carried by the base plate and surrounding the table, a plurality of anchors adjustably secured to the braces and engaging with the table and bearing members carried by the braces opposing the driving means and bearing against the periphery of the table.

7. A device of the character described including a base plate, a rotary table mounted thereon, a means for driving said table, upstanding braces carried by the base plate and surrounding the table, a plurality of anchors adjustably secured to the braces and engaging with the table and rotatable bearing members carried by the braces opposing the driving means and bearing against the periphery of the table.

8. In a device of the character described an anchor composed of a flat body carrying an engaging shoulder at one end for engaging with the rotary table and being bifurcated at its other end one of said bifurcations adapted to extend through the base plate of the device and means for securing the anchor to the base plate.

9. In a device of the character described a base plate and a rotary table secured thereon, upstanding braces carried by the base plate, and integral therewith, surrounding said table and bracing against the same and provided with lengthwise grooves, an anchor adjustably secured to each brace and fitting in the groove thereof and engaging with the rotary table and extending through said base plate, and means securing said anchors to said base plate.

10. In a device of the character described a base plate and a rotary table mounted thereon, upstanding braces integral with the base plate and surrounding the rotary table and bracing thereagainst on all sides, an anchor secured to each brace and engaging with said table, a securing means passing through each brace and its anchor and adjustably securing the latter to the former, and means for securing the anchors to the base plate and against movement relative thereto.

11. A device of the character described including a base plate and a rotary table mounted thereon, driving means for said rotary table, upstanding braces integral with the base plate and surrounding the table and bracing thereagainst on all sides, an anchor secured to each brace and engaging with the table, said anchor comprising a body portion carrying an engaging shoulder at one end and being bifurcated at its other end, one of said bifurcations adapted to extend through the base plate, a means extending through each brace and between the said bifurcations of the anchor and adjustably securing the anchor to its brace and means for securing the anchor fixed relative to the base plate.

12. A device of the character described including a base plate and a rotary table mounted thereon, driving means for said rotary table, upstanding braces integral with the base plate and surrounding the table and bracing thereagainst on all sides, an anchor secured to each brace and engaging with the table, said anchor comprising a body portion carrying an engaging shoulder at one end and being bifurcated at its other end, one of said bifurcations adapted to extend through the base plate, a means extending through each brace and between the said bifurcations of the anchor and adjustably securing the anchor to its brace, means for securing the anchor fixed relative to the base plate and bearing members rotatably secured to the braces opposing the driving means and bearing against the periphery of the table.

In testimony whereof I have signed my name to this specification in the presence of two subscribing witnesses.

HARRY R. DECKER.

Witnesses:
A. TOMPKINS,
J. W. YEAGLEY.